Dec. 21, 1965   A. F. BLEIWEISS ETAL   3,225,166
2-VANE VOLTAGE COMPENSATED SHUNT FLASHER
Filed Aug. 17, 1962

INVENTORS
Arthur F. Bleiweiss
George Colombo
Boris Orlov
John B. Dickson
BY Blum, Moscovitz,
Friedman and Blum
ATTORNEYS

United States Patent Office 3,225,166
Patented Dec. 21, 1965

3,225,166
2-VANE VOLTAGE COMPENSATED
SHUNT FLASHER
Arthur F. Bleiweiss, Great Neck, George Colombo, East Rockaway, John B. Dickson, Kew Gardens, and Boris Orlov, Woodhaven, N.Y., assignors to Signal-Stat Corporation, Brooklyn, N.Y., a corporation of New York
Filed Aug. 17, 1962, Ser. No. 217,648
10 Claims. (Cl. 200—122)

This invention relates to thermomotive flashers or circuit breakers and, more particularly, to such a flasher or circuit breaker incorporating novel voltage compensating means effective to modulate the circuit constants of the flasher or circuit breaker in accordance with changes in operating voltage.

Flashers and automatic circuit breakers are commonly used in automotive vehicles for flashing signalling lamps, such as turn signal lamps, flare lamps, and the like. The flashers so used in automotive applications generally are thermomotive flashers of either the series, or current-operated type, or the shunt, or voltage operated type. While thermomotive actuated automotive vehicle flashers are simpler and much less expensive than other types of flashers, such as, for example, motor driven commutators, they have the disadvantage of being very sensitive to changes in operating voltage, these changes affecting the cycling rates of the flashers, and the on-off time ratios thereof.

As will be appreciated by those skilled in the art, voltage fluctuations are characteristic of the electrical systems of automotive vehicles, which generally comprise a battery and a generator connected in parallel, with the voltage varying within limits even though voltage regulation is employed with the generator. For example, a nominal twelve-volt automotive vehicle electrical system may vary from eleven volts to about fifteen volts. This is a substantial percentage variation in the nominal voltage supply, and results in a correspondingly very substantial change in the operating characteristics of thermomotive flashers.

Part of the reason for the variation in performance of thermomotive flashers with variations in operating voltage is the fact that the heating rate of the operating element of a thermomotive flasher is a function of the voltage drop across the flasher. As a result of elevation in its temperature, the element will expand.

In the aforementioned series type flasher, the operating element is connected in series with the flasher load carrying contacts, and these contacts are normally closed. When the signalling circuit is energized, the load current flows across the contacts and through the operating element and the signal lamps. In this case, the overall resistance of the operating element is made very substantially less than that of the heating circuit for the operating element of a shunt type flasher, so that the effective voltage drop across the signal lamps is sufficient to effectively illuminate the latter. As the operating element heats and expands, it eventually snaps open the load circuit contacts so that the circuit is opened and the signal lamps become extinguished. The operating element thereupon cools and contracts and, after a predetermined contraction, re-closes the load carrying contacts of the flasher to again complete the circuit.

Thus, the operating element of a series type flasher is subjected, during its heating, to at least part of the potential applied across the circuit in which the flasher is connected, so that the part of the voltage drop across the operating element will vary with the applied voltage. As a result, the rate of expansion of the operating element will also vary with the applied voltage.

The foregoing will be clear when it is considered that the input heating energy (W) required to expand the operating element of a series flasher by a pre-set amount is equal to the product of the voltage drop (E) across the operating element, current (I) therethrough and time (T), or, expressed as an equation:

$$W = EIT$$

As the factor (W) remains constant, the time (T) will vary inversely with any variation in either (E) or (I) with the other of these latter two factors remaining constant, or will vary inversely with the product (EI) if both (E) and (I) vary concurrently.

Under standards set by the Society of Automotive Engineers (SAE), the voltage drop across automotive flashers, for example, of the series type, is held to 0.4 volt. As the major part of the voltage drop across a series flasher occurs in the operating element thereof, it may be safely assumed that the voltage drop across the operating element would be of approximately 0.3 volt, due to the resistance of this element. However, even if the operating element is not subjected to the full applied voltage, but only to a small fraction thereof, the percentage change in the voltage drop across the operating element will be substantially equal to the percentage change in the applied voltage.

The signal lamps used are incandescent lamps, and the filaments of these lamps have a very high cold to hot ratio of resistance. As a result of this, the resistance of the signal lamps varies substantially with the current flow therethrough. However, the resistance across the series flasher is substantially stable for all practical purposes. Nevertheless, both the voltage drop across the series flasher and the current flow through the flasher vary with the applied voltage and, with (W) remaining constant, the operating time (T) will vary inversely with applied voltage. This means that the cycling rate of a series type flasher increases, and the ratio of on-time to cycle time, hereinafter called the "on-time ratio," decreases with increasing operating voltage, and vice versa.

This is unsatisfactory for automotive vehicle operation as it has been found, by experience, that the most effective signal is provided when the flashing rate is approximately 90 f.p.m. with an on-time ratio of approximately 50%, and that when the flashing rate is outside the range of approximately 60 f.p.m. to 120 f.p.m. or the on-time ratio is outside the range of approximately 30% to 75%, the signal is generally conceded to be not easily recognizable.

To obviate or at least to ameliorate the tendency of the operating constants of series type thermomotive flashers to vary with variations of applied voltage, the present invention provides that at least one of the factors determining the operating characteristics of such series type thermomotive flashers is modulated in accordance with variations in the voltage drop across the flasher, such modulation being effected by shunting the operating element to by-pass at least a part of the current therearound through a shunt or parallel current flow circuit. This reduces the current flow through the operating element and accordingly will slow the operating rate of the flasher. By shunting at least a portion of the high resistance operating element, in accordance with an increase in the value of the operating voltage, the operating element will act as though a voltage of a lower value were effective thereacross and, with proper selection of circuit constants, the operating rate or cycling time, and the ratio of on-time to cycle time, of the flasher can be maintained substantially constant. For example, if the nominal operating voltage of the system is 12 volts, the shunting of the operating element can be made to take place at about 13.5 volts so that the normal tendency to increase the cycling rate with an increase in voltage is counteracted by virtue of the fact that a part of the current which normally would flow through the operating element is shunted so that the actual current through the operating element is reduced to a value lower than would otherwise correspond to the increased value of the operating voltage. Thereby, the operating element "sees" a current of a value corresponding to a lower operating voltage, such as the nominal 12 volts, for example.

In somewhat more detail, the particular modulating means of the present invention includes a snap action electrically conductive metal vane having an operating element in the form of a high resistance electrically conductive pull element secured thereto, and which is of the general type shown in Welsh U.S. Patent No. 2,756,304. The operating element has the characteristic of a high rate of expansion per degree rise in temperature, and has a heating winding would thereon. This heating winding is subjected to substantially the full operating potential applied across the flasher, and is arranged to effect snapping of the vane between two positions. The vane carries a movable contact which is operatively associated with a relatively fixed contact, and these two contacts control the connection of a resistance into shunt relation with the heat expansible operating element of the flasher when the operating voltage exceeds a predetermined value. When the operating voltage exceeds such predetermined value, this resistance is connected in shunt with the operating element of the flasher so that the latter "sees" a lower current, such as that corresponding to a nominal voltage of 12.0 volts, and accordingly operates the flasher at a rate and an on-time ratio corresponding to such nominal value.

The invention is applicable to any series type thermomotive flasher involving a heat expansible operating element which effects opening and closing of contacts. For example, it is applicable to a thermomotive flasher of the type incorporating a snap action vane and pull element, such as shown, for example, in said Patent No. 2,756,304. As applied to this type of thermomotive flasher, the shunt or by-pass circuit forming means is utilized to shunt at least a portion of the pull element which constitutes the heat expansible operating element for this type of flasher. To provide a specific example of the application of the principles of the invention, the invention will therefore be described as applied to this particular type of thermomotive flasher, although it will be understood that the principles of the invention are not limited thereto but are applicable to any type of thermomotive flasher involving an electrically conductive heat expansible operating element.

For an understanding of the principles of the invention, reference is made to the following description of typical embodiments thereof as illustrated in the accompanying drawings. In the drawings.

Figure 1:
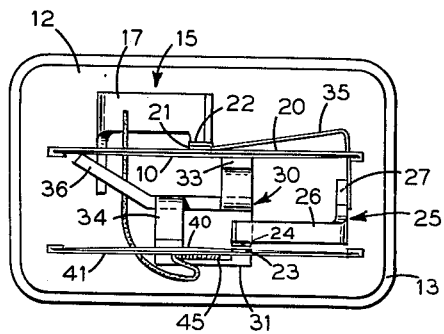
FIG. 1 is a top plan view, with the cover removed, of a series type flasher embodying the invention.

Referring to FIGS. 1 through 5, the principal operating components of the flasher are a snap action, preferably electrically conductive metal, main vane 10 to which is attached a pull ribbon 20 of electrically conductive thermally expansible metal whose resistance is such that the load current is capable of elevating its temperature by a substantial amount. As set forth in said Welsh patent, vane 10 is formed with linearly extending aligned and spaced pre-set deformations which extend diagonally thereacross and provide an initial bending line about which the vane is bent in its "restored" position. At the ends of this diagonal, the corners 11 of the vane are bent out of the general plane of main vane 10 and the opposite ends of pull ribbon 20 are permanently secured thereto as by welding, soldering, brazing, or the like. Pull ribbon 20 is secured to vane 10 in the cold contracted condition of the pull ribbon and while the vane is bent about another bend line extending at an angle to the deformations so that the vane, with pull ribbon 20 attached thereto, is bent about this other bend line in a "stress-deformed" condition and stores potential energy in the vane so that the latter tends always to snap back to the "restored" position as soon as the tension, holding it in the "stress-deformed" condition, is released.

As the temperature of pull ribbon 20 increases, due to the flow of electric current therethrough, the pull ribbon expands and, after a predetermined expansion of the pull ribbon, the potential energy in vane 10 overcomes the holding force of the pull ribbon and vane 10 snaps to its restored position in which it is bent about the linear deformations. As pull ribbon 20 cools and contracts, it snaps vane 10 back to the stress-deformed condition in which it is bent about a line extending about an angle to the deformations. As further explained in said Welsh patent, when vane 10 is fixedly supported at a zone or point spaced laterally of the bend line defined by the linear deformations, a movable portion of the vane will have a relatively high amplitude of movement when the vane is alternately snapped between its "restored" and "stress-deformed" positions.

The flasher operating elements are supported upon a dielectric base 12 which, in the form illustrated, is substantially rectangular with rounded corners and has a ledge 13 extending therearound. This ledge 13 serves to seat a metal casing or cover 14 for the flasher. However, it should be understood that, while a substantially rectangular base is illustrated, the base could have any other configuration in plan without departing from the scope of the invention.

Three generally upright support brackets, of electrically conductive metal, extend upwardly from base 12. Bracket 15 is preferably integral with a prong 16 molded through the base 12, and includes a relatively narrow portion 17 extending at an acute angle to base 12 and terminating adjacent the center of vane 10. The free end of portion 17 carries a contact 22 which is normally engaged with a contact 21 on pull ribbon 20. Contacts 21 and 22 are normally closed and are the load current carrying contacts of the flasher.

A second bracket 30 extends upwardly from base 21, and serves as an electrically conductive support bracket for main vane 10 and also for an auxiliary vane 40. Bracket 30 has a lower off-set portion provided with a downturned end 31 engaged in base 12, and lower end 31 is brazed, welded, soldered, riveted, or otherwise mechanically and electrically connected to the upper end of a prong 32 molded through base 12. Above end 31, bracket 30 is off-set inwardly and then extends upwardly substantially perpendicular to base 12. The upper end of bracket 30 is forked to provide two arms 33 and 34 off-set outwardly in opposite directions and spaced substantially equidistant laterally from the vertical center line of bracket 30. Off-set arm 33 is welded, brazed, soldered, riveted, or otherwise anchored to vane 10 at a point substantially laterally of the line of deformations therein. Arm 34 is anchored to the auxiliary vane 40 at a point spaced laterally of the linear deformations therein, vane 40 being substantially identical with vane 10, including the longitudinally spaced linear deformations and the bent corners to which are secured the opposite ends of a pull ribbon 41 of electrically conductive heat expansible material. Bracket 30 has a further arm 36 extending laterally therefrom intermediate its height, arm 36 extending at an angle toward the inner surface of vane 10. Arm 36, in cooperation with vane 10, constitutes a "noise maker" or "sounder" for the flasher, and terminates in very slightly spaced relation to vane 10. During snapping of vane 10, arm 36 is impacted by the vane to provide a definite click or other sound to indicate that the flasher is operating.

Figure 2:
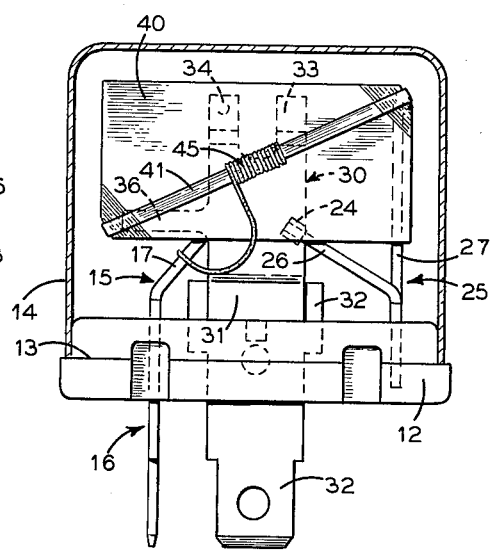
FIG. 2 is a front elevational view of this flasher, with the cover shown in section.
Figure 3:
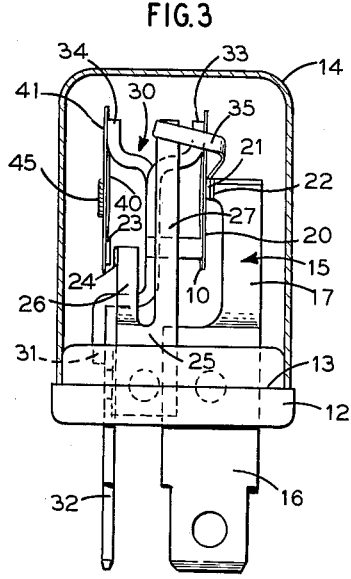
FIG. 3 is a right end elevational view of this flasher, the cover again being shown in section.
Figure 4:
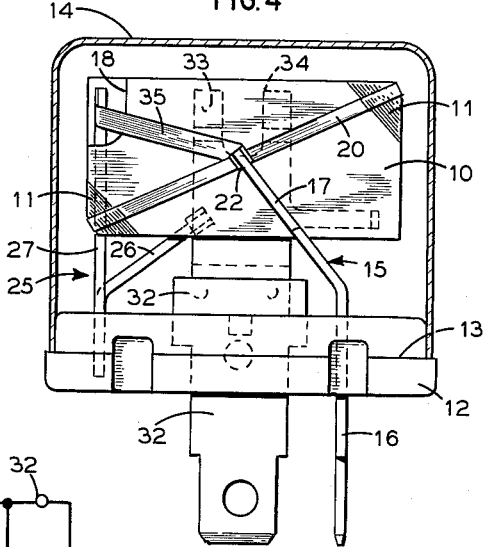
FIG. 4 is a rear elevational view of this flasher, the cover being shown in section.

A third bracket 25 has its lower end molded into base 12 adjacent one end of the latter and, above base 12, bracket 25 is forked to provide arms 26 and 27. Arm 26 is bent inwardly, as best seen in FIGS. 2 and 4, and extends adjacent the inner surface of vane 40. The free end of arm 26 carries a contact 24 disposed in closely adjacent spaced relation to a contact 23 on the inner surface of vane 40. Contacts 23 and 24 are thus normally open. Arm 27 extends upwardly substantially normal to base 12 and its upper end terminals just short of the upper edges of vanes 10 and 40.

A shunting resistor 35, in the form of a strip of high electric resistance metal, has one end brazed, welded, riveted, soldered or otherwise anchored to the upper end of arm 27, and the opposite end of ribbon resistor 35 is brazed or welded or the like to pull ribbon 20 adjacent the contact 21 thereon. The upper left-hand corner of vane 10, as viewed in FIG. 4, is preferably cut away, as at 18, to provide clearance for resistance ribbon 35. Pull ribbon 41 of vane 40 is indirectly heated by a high electrical resistance winding 45 which is wound thereon, preferably along its midsection, and has one end electrically and mechanically connected to portion 17 of bracket 15, and the opposite end electrically and mechanically connected to pull ribbon 41.

Figure 5:
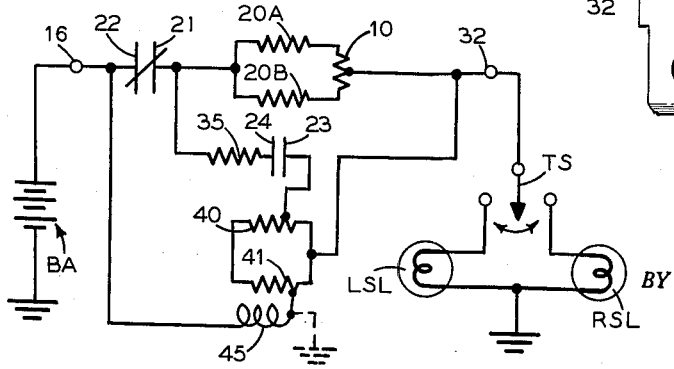
FIG. 5 is a schematic wiring diagram of the flasher shown in FIGS. 1–4.

The operation of the flasher of FIGS. 1 to 4 will be understood best with further reference to FIG. 5, which is a schematic wiring diagram in which a source of operating potential is indicated as a battery BA having one terminal grounded and the other terminal connected to lug or prong 16 of the flasher. Battery BA represents the usual automotive source of electrical power such as, for example, a twelve-volt battery-generator system. Lug or prong 32 of the flasher is illustrated as connected through a turn signal switch TS to either of a pair of lamps LSL or RSL, representing the left and right turn signal lamps of a vehicle. Switch TS is illustrated as in the neutral position, and is selectively engageable with either of a pair of terminals depending upon which type of turn or direction is to be signalled. For a better understanding of the electric theory involved, in FIG. 5, pull ribbon 20 is illustrated as a pair of parallel resistances 20A and 20B, and vane 10 is illustrated as a resistance. Similarly, pull ribbon 41 and vane 40 are illustrated as a pair of parallel resistances.

At or below the nominal operating potential of approximately twelve volts, the parts occupy the position shown in FIGS. 1 through 5. When the switch TS is closed in either direction, a current flows through the flasher and the latter snaps between open and closed positions in the manner previously described, so as cyclically to separate and re-engage contacts 21 and 22. Thus, it will be seen that the vane 10 and pull ribbon 20, together with the contacts 21, 22 and the prong 16, as well as together with the bracket 30 and prong 32 form a cyclically operable circuit opening and closing means for cyclically opening and closing a circuit between the source of operating potential and a lamp, when the operator closes the switch TS, so as to provide a given cycling rate when the source is at a predetermined nominal operating potential. At this time, the contacts 23 and 24 are open, so that resistance 35 is not in circuit. This is due to the fact that the circuit constants of the heating winding 45, and of the pull ribbon 41, are so selected that, at such nominal operating potential, the pull ribbon 41 is not heated an amount sufficient to cause it to expand to the extent that vane 40 can snap from its stress-deformed position to its restored position.

If the operating potential should increase above the nominal value, for example to a value of approximately 13.5 volts, the resultant increased potential drop across the heating winding 45 will result in a higher heating of the pull ribbon 41 and the latter will expand sufficiently to permit the vane 40 to snap from its stress-deformed position to its restored position, thus engaging contacts 23 and 24. This connects the resistance 35 in a parallel or shunt current flow circuit relative to the pull ribbon 20, thus reducing the current flow through the pull ribbon 20 so that the latter will heat less rapidly. Therefore, the parallel connection of the resistor 35 and the pair of normally open contacts 23 and 24 to the main circuit which operates cyclically to provide a given cycling rate for the flasher renders it possible upon closing of the contacts 23 and 24 to maintain the cycling rate substantially constant even when the operating potential rises substantially above the nominal operating potential, and the snap vane 40, together with the pull ribbon 41 and, of course, the heating coil 45, which is connected between the source of operating potential and the pull ribbon 41 form a means which responds to an increase in the operating potential by a given increment above the nominal operating potential for automatically closing the normally open contacts 23 and 24 so as to provide a connection of the shunt circuit which includes the resistor 35 to the main circuit for maintaining the cycling rate substantially constant even if the operating potential increases undesirably above the nominal operating potential. The constants are so selected that the reduced heating of the pull ribbon 20 is of such a value that the latter will act as though an operating potential of such nominal value were applied thereto. The cycling rate and the on-time ratio of the flasher are thus maintained at values substantially equal to the values which would pertain were the operating potential at such nominal value of approximately twelve volts.

It will be noted that, in effect, the heating winding 45 is connected across the source BA, and thus one end of this heating winding could be connected to the lug 16, as shown, and the other end thereof could be grounded as indicated in broken lines, and its connection to pull ribbon 41 removed. In this case, the pull ribbon 41 would not constitute part of the circuit for current flow through the heating winding 45. However, the actual physical arrangement shown in FIGS. 1 through 4 is the most convenient way for applying the source operating potential across the heating winding 45. While a specific embodiment of the invention has been described in detail to illustrate the application of the principles of the invention, it will be understood that the invention may be embodied otherwise without departing from such principles.

What is claimed is:

1. For use between a source of operating potential and a lamp, a flasher comprising a first cyclically operable circuit opening and closing means for cyclically opening and closing a circuit between such source and lamp at a given cycling rate when said source is substantially at a given nominal operating potential, a shunt circuit connected in parallel with said first cyclically operable means and including a resistor and a pair of normally open contacts, and second cyclically operable means operatively connected to said normally open contacts and connected to said source of operating potential for automatically closing said normally open contacts in response to a rise in the operating potential by a given increment above said nominal operating potential, so as to automatically connect said resistor in parallel with said cyclically operable means to maintain said cycling rate substantially constant when the operating potential rises undesirably.

2. A flasher as recited in claim 1 and wherein said cyclically operable means includes a snap vane and pull ribbon assembly, the snap vane of which snaps back and forth between stress-deformed and restored positions, and element located in the path of snapping movement of said vane to be impacted by the latter to provide a sound indicating that the flasher is operating.

3. A flasher comprising an assembly including an electrically conductive snap vane and an electrically conductive pull ribbon connected at its opposite ends to said snap vane for maintaining the latter in a stress-deformed position when said pull ribbon is cold and for releasing said snap vane for movement to a restored position when said pull ribbon has been heated and expands by a given amount, said assembly also including a movable contact carried by said pull ribbon and a stationary contact engaged by said movable contact when said pull ribbon is cold so that said contacts are normally closed, said assembly being adapted to be connected into a circuit between a source of operating potential and a lamp for cyclically flashing the lamp at a given cycling rate when the source is substantially at a nominal operating potential, a shunt circuit connected in parallel with said snap vane and pull ribbon and including a resistor and a pair of normally open contacts, and means operatively connected to said normally open contacts and connected to said source of operating potential for automatically closing said normally open contacts in response to a rise in the operating potential by a given increment above the nominal operating potential for closing the shunt circuit when the operating potential rises by said given increment to maintain the cycling rate substantially constant during such a rise in the operating potential.

4. A flasher as recited in claim 3 and wherein said normally open contacts of said shunt circuit include a stationary contact and a movable contact, said means responding to said increase in operating potential including a second snap vane carrying said latter movable contact for moving the latter into engagement with the stationary contact of said normally open contacts when said second snap vane is in a restored position, a second pull ribbon connected at its ends to said second snap vane for maintaining the latter in a stress-deformed position, with said latter movable contact spaced from the latter stationary contact when said second pull ribbon is cold, and a heating coil wound directly around a portion of said second pull ribbon and connected electrically with the source of operating potential for heating said second pull ribbon to an extent sufficient to release said second snap vane for movement to its restored position only when the operating potential rises by said given increment above said normal operating potential.

5. A flasher comprising a first electrically conductive bracket, a pair of electrically conductive snap vanes connected electrically with and supported by said first bracket, a first pull ribbon extending across and connected at its ends to one of said snap vanes for maintaining the latter in a stress-deformed condition when said first pull ribbon is cold, said first pull ribbon also being electrically conductive and expanding when heated to a given extent for releasing said one snap vane for movement to a restored position, said first pull ribbon carrying a first movable contact, a first stationary contact engaging said first movable contact when said first pull ribbon is cold, so that during movement of said one snap vane between said restored and stress-deformed positions thereof, said movable contact will move into and out of engagement with said stationary contact; said bracket, said one snap vane, said first pull ribbon, and said first stationary movable contacts adapted to be connected into a circuit between a source of operating potential and a lamp for flashing the lamp at a cycling rate when the source is substantially at the nominal operating potential, a second electrically conductive bracket, a second stationary contact carried by said second bracket, a second movable contact carried by the other of said snap vanes for movement therewith when said other snap vane moves between stress-deformed and restored positions, said other snap vane moving said second movable contact into engagement with said second stationary contact when said other snap vane moves from its stress-deformed to its restored position so that said second movable and stationary contacts are normally open, an electrical resistor extending between and electrically connected with said second bracket and said first pull ribbon, a second pull ribbon extending across and connected at its ends to said other snap vane for maintaining the latter in its stress-deformed position when said second pull ribbon is cold, and an electrically conductive coil surrounding a portion of said second pull ribbon and having one end electrically connected to said first stationary contact and adapted to be connected electrically with said source for heating said second pull ribbon to an extent sufficient to release said other snap vane for movement to its restored position only when the operating potential of the source rises by a given increment above said nominal operating potential thereof, so as to connect said resistor in parallel with said one snap vane and said first pull ribbon to maintain the cycling rate substantially constant even when the operating potential rises by said given increment above the nominal operating potential.

6. A flasher as recited in claim 5 and wherein the other end of said coil is connected to ground.

7. A flasher as recited in claim 5 and wherein said second bracket is situated between said snap vanes and wherein said one snap vane is situated between said second bracket and said first pull ribbon, said one snap vane being formed with a cutout through which said resistor passes from said second bracket to said first pull ribbon.

8. A flasher as recited in claim 7 and wherein said cutout is in the form of a notch located at one corner of said one snap vane.

9. A flasher as recited in claim 5 and wherein an element is located in the path of movement of said one snap vane to be cyclically impacted thereby for providing a sound during operation of the flasher.

10. A flasher as recited in claim 9 and wherein said element is an elongated arm integral with and extending from said first bracket to the immediate vicinity of said one snap vane.

References Cited by the Examiner
UNITED STATES PATENTS

| | | | |
|---|---|---|---|
| 2,610,283 | 9/1952 | Kolisch | 200—138 |
| 2,756,304 | 7/1956 | Welsh | 200—122 |
| 2,758,175 | 8/1956 | Hotchkiss | 200—122 |
| 2,842,642 | 7/1958 | Colombo et al. | 200—122 |
| 2,847,554 | 8/1958 | Huffman | 200—138 |
| 2,917,604 | 12/1959 | Krambo et al. | 200—113 |
| 3,098,139 | 7/1963 | Bleiweiss et al. | 200—137 |

BERNARD A. GILHEANY, *Primary Examiner.*

ROBERT K. SCHAEFER, *Examiner.*